United States Patent [19]

Hart et al.

[11] Patent Number: 5,553,928
[45] Date of Patent: Sep. 10, 1996

[54] SIMPLIFIED FULL-FUNCTION VALVE FOR HEAVY DUTY BRAKE SYSTEMS

[75] Inventors: James D. Hart, Ortinville, Mich.; Michael J. Moody, Smithville, Mo.

[73] Assignee: Midland Brake, Inc., Kansas City, Mo.

[21] Appl. No.: 411,936

[22] Filed: Mar. 28, 1995

[51] Int. Cl.⁶ .................................................. B60T 13/00
[52] U.S. Cl. .................. 303/7; 303/9.76; 303/9; 303/40
[58] Field of Search .................. 303/9.76, 7, 9, 303/71, 13, 29, 28, 30, 40, 118.1; 188/170

[56] References Cited

U.S. PATENT DOCUMENTS

| | | | |
|---|---|---|---|
| 3,992,064 | 11/1976 | Carton et al. | 303/7 |
| 4,042,281 | 8/1977 | Ury | 303/29 |
| 4,080,004 | 3/1978 | Ury | 303/9 |
| 4,163,585 | 8/1979 | Ury | 303/9 |
| 4,472,001 | 9/1984 | Fannin | 303/9 |
| 4,593,954 | 6/1986 | Campanini | 303/7 |
| 4,915,456 | 4/1990 | Gross et al. | 303/9 |
| 5,236,250 | 8/1993 | Moody et al. | 303/7 |
| 5,322,353 | 6/1994 | Wallestad | 303/7 |
| 5,445,440 | 8/1995 | Plantan | 303/9.76 |
| 5,458,403 | 10/1995 | Moody | 303/9.76 |

*Primary Examiner*—Douglas C. Butler
*Attorney, Agent, or Firm*—Leydig, Voit & Mayer, Ltd.

[57] ABSTRACT

A simplified integrated full-function valve for heavy duty brake systems comprising a valve body having individual ports for fluid communication with spring brake chambers, service brake chambers, pressurized-air reservoir and exhaust and for receiving pressurized control and supply air from respective sources thereof; internal passageways within the valve body providing selected fluid communication with the various ports; a plurality of valve modules within the valve body comprising a spring brake valve module, a relay valve module and a biased one-way pressure protection valve module, and disposed to selectively determine the fluid communications within the internal passageways and ports responsive to the respective positions of the valve modules; the port and related internal passageways for the spring brake chambers being fluid-communicatively-isolated from the reservoir, the service brake chambers and the control air, whereby the number of the internal passageways within the valve body is minimized; the simplified design lending itself to functional flexibility.

16 Claims, 5 Drawing Sheets

SIMPLIFIED FULL-FUNCTION VALVE FOR HEAVY DUTY BRAKE SYSTEMS

BACKGROUND OF THE INVENTION

1. Field of the Invention

This invention relates to an improved full-function brake valve for use in fluid pressure braking systems primarily employed on the semi-trailers of heavy-duty highway tractor-trailer vehicle combinations. More specifically, it relates to a simplified full-function brake valve which combines the functions of, and replaces, multiple separate brake valves on highway semi-trailers with concomitant advantages, and is also less complex and costly than other full-function valves designed for such purposes.

2. Discussion of Prior Art

To meet all of the emergency and service requirements of modern heavy-duty highway tractor-trailer combinations, while meeting all of the pertinent governmental regulations, including Federal Regulation FMVSS 121 (Docket 90-3, Notice 2), the trucking industry has resorted to a number of semi-trailer brake valve arrangements which have led to complexity, high costs, installation and maintenance difficulties and related problems. These valve arrangements include multiple valves with multiple complex inter-connections, all designed to carry out multiple requisite brake functions.

Manifestly, the various valve installations and interconnections to accomplish all of these functions on a modern tandem semi-trailer are complex, costly, difficult and inconvenient to install, troubleshoot, service and maintain and otherwise are undesirable from a parts inventory standpoint. Previous efforts to integrate the various valve requirements within a single envelope or housing have not resulted in brake systems meeting current requirements.

Illustrative of the prior art is Gross et al. U.S. Pat. No. 4,915,456 and patents cited therein, i.e., Ury U.S. Pat. Nos. 4,042,281, 4,080,004 and 4,163,585; Fannin U.S. Pat. No. 4,182,535; and Carton et al. U.S. Pat. Re. 30,205 (Reissue of U.S. Pat. No. 3,992,064). Still other illustrative prior art includes Fannin U.S. Pat. No. 4,472,001 and Campanini U.S. Pat. No. 4,593,954 and the patents cited therein. None of these patents disclose or suggest a simplified full-function valve, all housed within a single envelope and meeting regulatory requirements, such as provided by the present invention.

Current efforts to cope with the shortcomings of such prior art are reflected, for example, in Moody et al. U.S. Pat. No. 5,236,250 and Wallestad U.S. Pat. No. 5,322,353, both owned by the same assignee as herein. While successfully coping with and solving certain of the problems of the prior-art approaches, such current approaches have themselves introduced considerable complexity in the integrated valve assembly itself and some limitations performance-wise, e.g., slower drive-away capability. Moreover, in the event of future changes in the regulatory or markets requirements for the performance of such full-function valves in certain respects, current designs will necessitate very-costly redesigns.

OBJECTS OF THE INVENTION

It is therefore a general object of the invention to provide within a single envelope a simplified full-function integrated brake valve for heavy-duty highway trailers consistent with the requirements of the aforementioned Federal Regulation.

It is another general object to provide an integrated full-function valve having a design which is less complex and costly than competitive full-function valves and is capable of fast drive-away performance.

It is another general object to provide a full-function valve system for heavy-duty highway semi-trailers which has fewer external interconnecting fluid lines or hoses and other components and also fewer internal components within a single envelope whereby such simplification reduces complexity and cost.

It is another object to reduce the number of separate components and passageways in a highway semi-trailer braking systems featuring full-functioning valves, and yet provide the requisite brake functions for safe operation including, optionally, anti-compounding protection.

It is another object to provide a single, compact full-function brake valve which alone provides the requisite brake functions for a tandem axle semi-trailer as above set forth, including, where permitted, the design option, without the necessity of a costly redesign, of releasing or not releasing the spring brakes before enablement of the service brake function, the latter providing an anti-drive-away feature, if desired.

It is still another object to provide a lower-cost semi-trailer braking system meeting current requirements and having a single valve envelope to which all hoses or lines connect and thus fewer potential failure locations, greater ease of installation, servicing and field trouble-shooting, and reduced parts inventory requirements.

These and other objects of the present invention become apparent from the description hereinafter set forth.

Because most modern-day trailer brakes systems employ pressurized air as the fluid medium for actuation, and such use is contemplated in the presently-known best-mode embodiment described herein, the following description of the invention assumes that air is the medium. As those skilled in the art will recognize, however, the invention is not limited thereto; and the inventive concept may be adapted to other fluid media.

SUMMARY OF THE INVENTION

These objects are achieved by a simplified integrated full-function valve comprising a valve body having individual ports for fluid communication with spring brake chambers, service brake chambers, pressurized-air reservoir and ambient exhaust, and for receiving pressurized control air and supply air from respective sources thereof. The internal passageways within the valve body are in fluid communication with the ports and are disposed so as to communicate the pressurized control air for service brake control, and supply air to and from the reservoir, the spring brake chambers and the service brake chambers of the air brake system, and to ambient exhaust. Also within the full-function valve body is a plurality of valve modules disposed to selectively determine the fluid communications within the internal passageways and ports responsive to the respective positions of the valve modules. The port and related internal passageways for the spring brake chambers are fluid-communicatively-isolated from the reservoir, the service brake chambers and the control air, whereby the number of internal passageways within the valve body is minimized, resulting in less complexity and lower cost.

The plurality of valve modules within the full-function valve body includes a spring brake valve module providing (i) fluid communication from the spring brake port to an exhaust port when air pressure at the supply port is less than a first predetermined pressure, and (ii) fluid communication from the supply port to the spring brake ports when the air pressure at the supply port is at or higher than the first predetermined pressure.

The plurality of valve modules within the full-function valve body also includes a relay module for selectively employing supply air to actuate the service brakes responsive to control-air signals received at the control port of the valve body. The plurality of valve modules within the full-function valve body also includes a biased one-way pressure protection valve module providing fluid communication from the supply port to the reservoir port and to the relay valve module at or above a second predetermined air pressure at the supply port.

The aforementioned relay valve module may be of prior art design. Typically, in a first mode it provides fluid communication between the service brake ports and an exhaust port in response to decreasing pressure or zero pressure at the control port. In a second mode it provides at least fluid communication from the reservoir port to the service brake ports in response to increasing pressure at the control port. Finally, in a third mode it blocks fluid communication to and from the service brake ports in response to a stabilized elevated pressure at the control port.

The aforementioned biased one-way pressure protection valve also includes a consistently-disposed unbiased one-way check valve associated therewith. This obviates any fluid flow from the reservoir port or the relay valve module to the supply port or to the spring brake valve module. This protects the stored pressurized fluid for the service brakes in the event, for example, the supply to the full-function valve fails.

As those skilled in the art will recognize, if the second predetermined air pressure is higher than the first predetermined air pressure at start up, the spring brakes will be released prior to activation of the service brake capability function. Any apparent risk is minimized, however, by the fact that the pressure buildup is rapid. Moreover, if for some reason the supply-air pressure from the tractor fails to build up, a warning light and buzzer in the tractor or equivalent means alerts the driver to the existence of a potential problem. In addition, in the event the pressure at the supply-air port falls below a predetermined minimum, valve means on the tractor automatically isolates the tractor air supply from the trailer.

If desired and consistent with regulatory requirements, such theoretical risk can be obviated in the full function valve of the present invention by specifying that the second predetermined air pressure be lower than the first predetermined air pressure. This assures functioning of the service brakes prior to release of the spring brakes. This operational flexibility is another feature of the simplified design of the present invention.

To differentiate in this description the pressurized air which fills the reservoir, releases the spring brakes and actuates the service brakes, from the pressurized air which controls the relay valve module, the former is referred to as supply air and the latter is referred to as control air. Similarly, the respective ports are referred to as the supply port and the control port or, alternatively, as a supply-air port and the control-air port. As those skilled in the art are aware, supply air is often termed emergency air and control air is often termed service air, terms not used herein.

As those skilled in the art will also recognize, the simplified integrated full-function valve of the present invention readily lends itself to the inclusion of an anti-compounding feature. This will become apparent from the detailed description.

BRIEF DESCRIPTION OF THE DRAWINGS

The present invention may be more clearly understood from the following description of a specific and preferred embodiment in conjunction with the schematic drawings, wherein.

The drawings herein are presented in the form of functional schematics because they are more-readily understandable than the complex physical embodiments thereof. Moreover, actual embodiments or installations may structurally differ substantially, depending upon the particular semi-trailer for which the braking system is designed, as those skilled in the art will recognize. Illustrative physical embodiments of certain of the individual components of the integrated valve of the present invention are known to those skilled in the art as set forth, for example, in certain of the prior art identified hereinabove.

It should also be understood that the term "passageway" is not necessarily limited to a tubular path or other regularly-shaped path. It also encompasses fluid communicating spaces, chambers and the like.

DETAILED DESCRIPTION OF DRAWINGS

Figure 1:
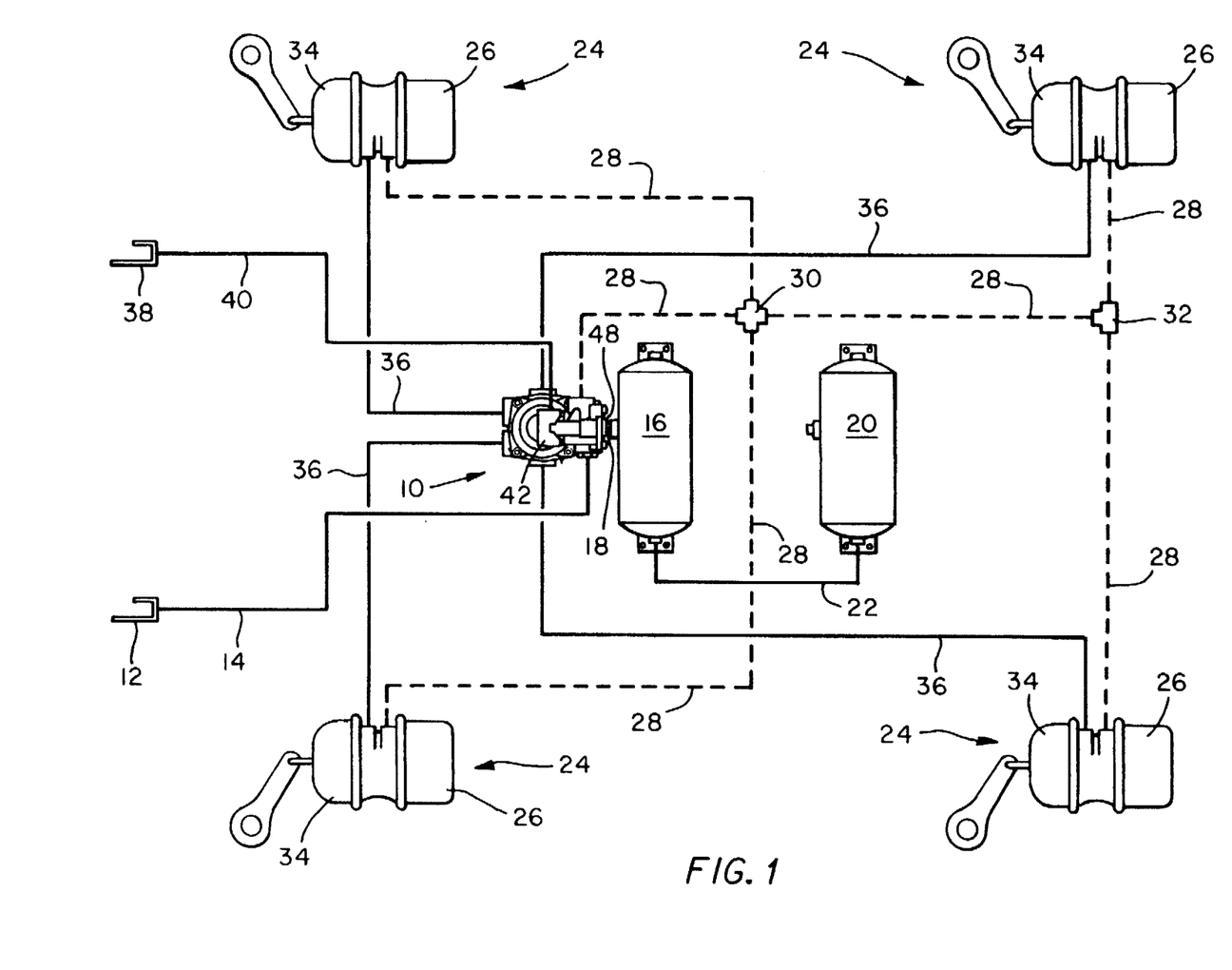
FIG. 1 is an overall schematic of a semi-trailer tandem brake system wherein the simplified full-function valve of the present invention is advantageously employed.

The schematic of FIG. 1 represents a semi-trailer tandem brake system wherein the simplified full-function valve 10 of the present invention is advantageously employed. The pressurized supply air to the full-function valve 10, typically at about 125 psig, is received into the system from a supply source (not shown, but usually the tractor of the tractor-trailer combination) via a trailer glad-hand connector 12 and is communicated to the simplified full-function valve 10 via line 14.

As will be described in detail in connection with FIG. 2–5, the pressurized air received via connector 12 and line 14 is directed by the internal valve modules, passageways and ports of full-function valve 10 to and from reservoir (tank) 16 via connector line 18, optional supplemental reservoir 20 in turn being in fluid communication with reservoir 16 via line 22. The pressurized supply air is also directed by full-function valve 10 to the dual chambers of brake actuators 24, the spring (parking) brake chambers 26 thereof being in fluid communication with, and controlled by, full-function valve 10 via lines 28 including couplings 30 and 32. Similarly, the service brake chambers 34 of brake actuators 24 are in fluid communication with, and controlled by, full-function valve 10 via lines 36.

Control air from the tractor for controlling the service brake valve module within full-function valve 10 is received via a gladhand 38 and line 40. As will be apparent, the service brake valve module functionally may be of conventional relay design.

Figure 2:
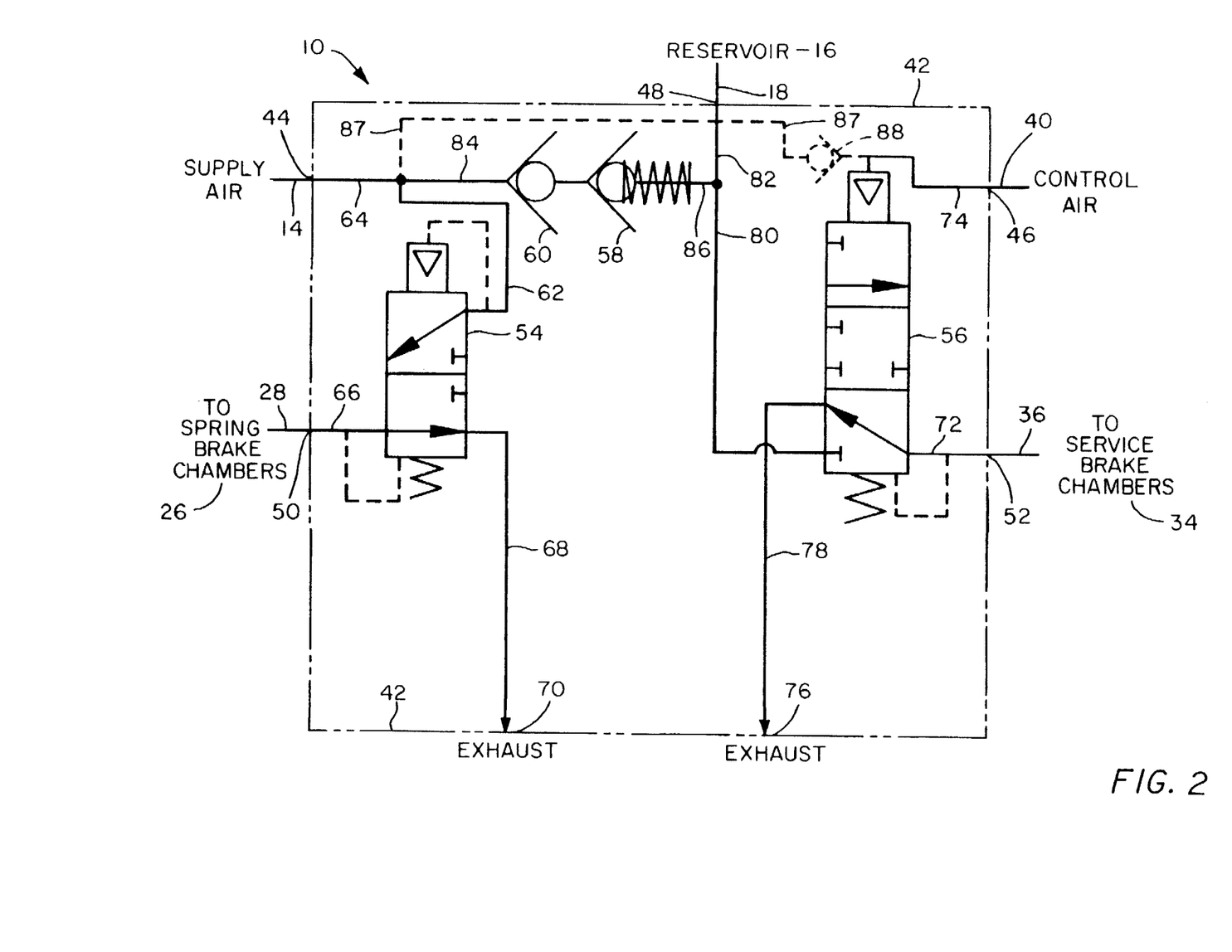
FIG. 2 is a functional schematic of a full-function valve itself, showing the ports, internal passageways and valve modules, all as part of, or internal to, a single valve envelope, the components being in an at-rest (unpressurized) condition.

Referring to FIG. 2, the simplified full-function valve 10 is presented schematically in an at-rest condition. Supply line 14, control line 40, reservoir line 18 (and reservoirs 16 and 22), spring brake chamber line 28 (and spring brake chambers 26) and service brake chamber line 36 (and service brake chambers 34) are all at atmospheric pressure. In this condition, the spring brakes are applied and the service brakes are not. Supply air line 14 is connected to single housing envelope 42 of full-function valve 10 at port 44, control air line 40 at port 46, reservoir connector line 18 at port 48, spring brake lines 28 at port 50 and service brake lines 36 at port 52.

The simplified full-function valve 10 also encloses within housing envelope 42 a plurality of valve modules, namely, spring brake valve module 54, relay valve module 56 and biased one-way pressure protection valve module 58, the latter including check valve 60. As shown, module 54 is in fluid communication via internal passageway 62 with passageway 64 and with supply-air port 44. Module 54 is also connected via passageway 66 to spring brake port 50 and via passageway 68 to exhaust port or outlet 70.

Relay valve module 56 is in fluid communication with port 52, line 36 and the service brake chambers 34 via passageway 72. Module 56 is also in fluid communication with port 46, line 40 and the source of control air via passageway 74, and with exhaust port or outlet 76 via passageway 78. Module 56 is also in fluid communication with reservoir port 48 via passageways 80 and 82.

Pressure protection valve module 58 and check valve 60 are in fluid communication with supply-air port 44 via passageways 84 and 64. Module 58 and valve 60 are in fluid communication with passageways 80 and 82 via passageway 86.

Housing envelope 42 may also optionally enclose an anti-compounding circuit, shown schematically in dashed lines on FIG. 2 only, and comprising passageway 87 with one-way check valve 88, effectively establishing one-way fluid communication between the supply air and the control air. The optional anti-compounding feature copes with the problem arising when pressure in the supply line drops low enough to cause incipient application of the spring brakes while at the same time the pressure of the control air is substantially higher. Such circumstances can result in both service brake and spring brake forces being applied simultaneously, causing dangerous brake action.

Again with reference to FIG. 2, the presence of passageway 87 and one-way check valve 88 remedies the situation. As soon as the supply-air pressure drops significantly below the control-air pressure, check valve 88 opens, equalizing the pressure, usually by raising the supply-air pressure. This prevents application of the spring brake forces and compounding of the spring and service brake forces. While passageway 87 and check valve 88 are illustrated internally of housing envelope 42, the same result can be obtained by connecting the same elements or equivalents externally of envelope 42, that is, for example, to line 14 or port 44 and to line 40 or port 46.

Figure 3:
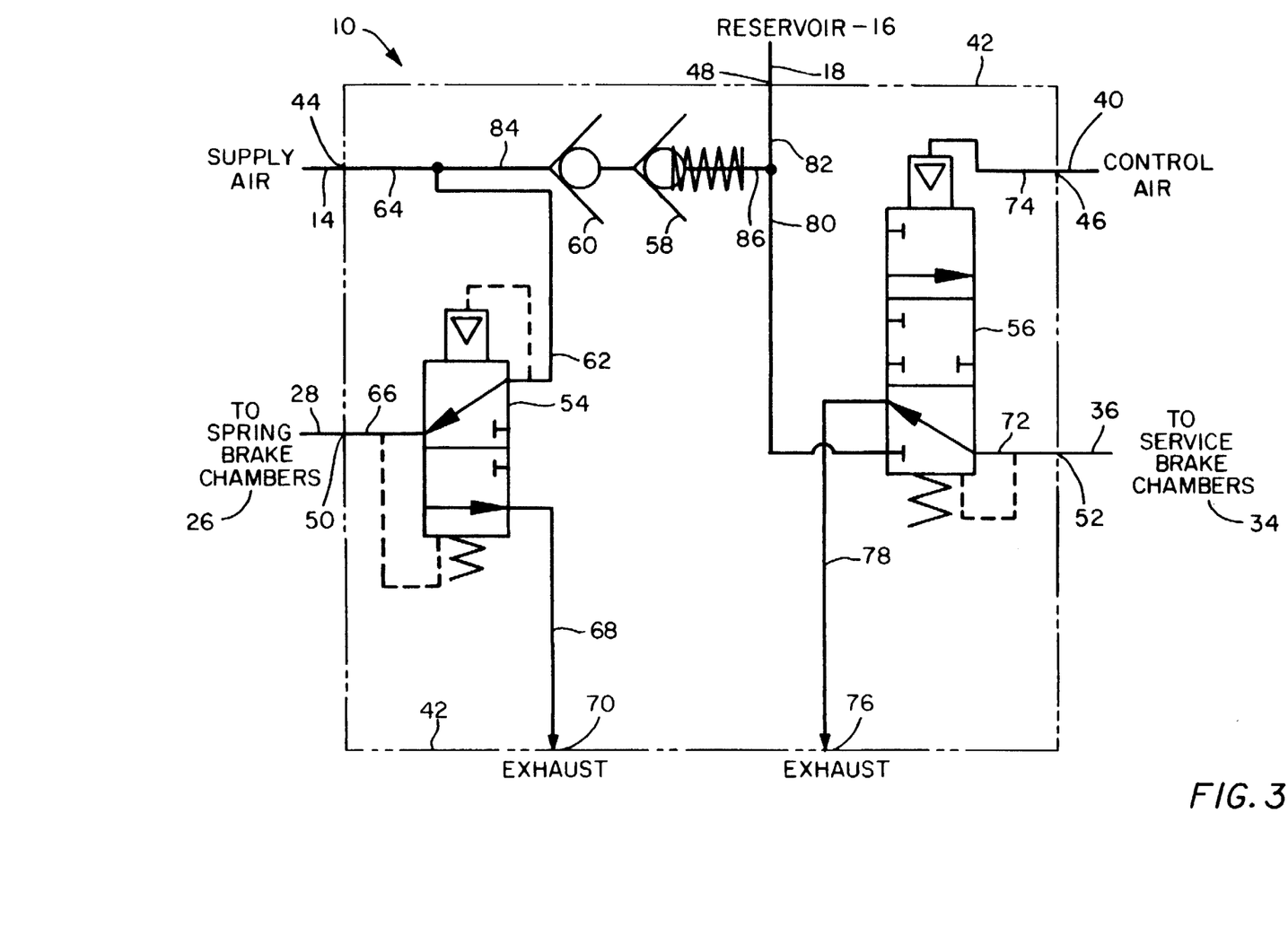
FIG. 3 is similar to FIG. 2 except that it is specific to the embodiment wherein the spring brake valve module is activated at a supply-air pressure less than that required to actuate the biased one-way pressure protection valve module, the valve positions being depicted with such less supply-air pressure.

The schematic of FIG. 3 shows the embodiment of full-function valve 10 wherein spring brake valve module 54 is actuated at a supply-air pressure less than the pressure differential required to actuate (open) pressure protection valve module 58. For example, spring brake valve module 54 may typically be actuated at about 40 psig, significantly below the 70 psi differential typically required to open pressure protection valve 58. Thus, the schematic of FIG. 3 illustrates the respective valve dispositions when the supply air has built up above about 40 psig but prior to reaching at least about 70 psig. As a result, valve module 54 has shifted downwardly as viewed in FIG. 3 into the spring brake charging position.

Instead of being connected to the exhaust port, as in FIG. 2, line 28, port 50 and passageway 66 are connected via spring brake module 54 and passageways 62 and 64 to port 44 and supply-air line 14. This commences the charging of spring brake chambers 26 with supply air, the actual release of the spring brakes occurring at the design release pressure thereof, e.g., typically about 60 psig.

While the ball of one-way check valve 60 is shown seated in FIG. 3, it is initially momentarily unseated while the cavity between it and pressure protection valve module 58 is being pressurized to substantially that of passageway 84. It is unseated, of course, any time that there is a pressure differential across it greater than that required to overcome the slight force of the usual spring (not shown) holding the ball in its seated position, e.g., about 1 psi or less.

Figure 4:
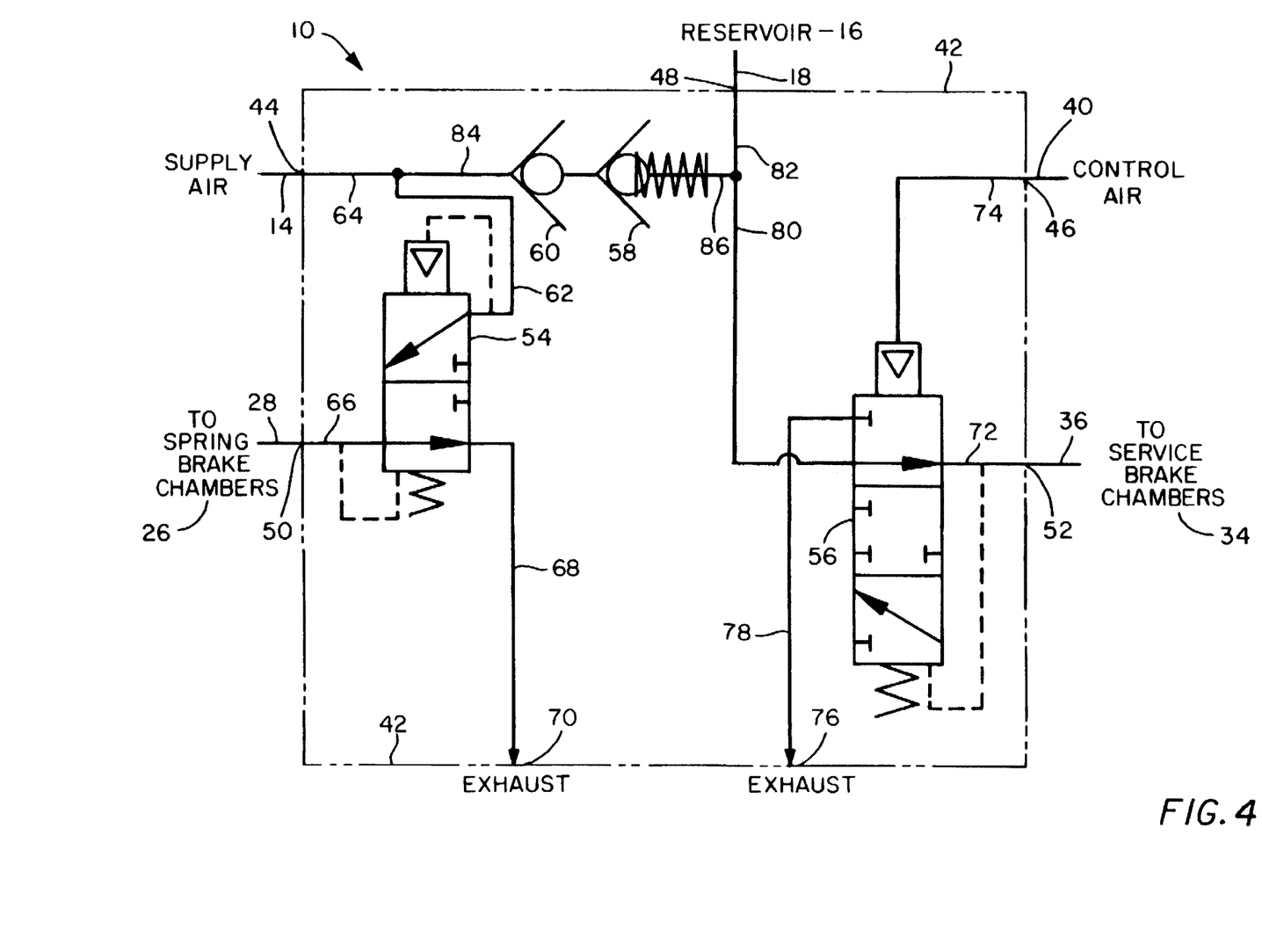
FIG. 4 is similar to FIG. 2 except that it is specific to the embodiment wherein the biased one-way pressure protection valve module is activated at a supply-air pressure less than that required to activate the spring brake valve module, the valve portions being depicted with such less supply-air pressure.

The schematic of FIG. 4 shows the embodiment of full-function valve 10 wherein the actuation pressure relationships of spring brake valve module 54 and pressure protection valve 58 are reversed from that of FIG. 3. Thus, pressure protection valve module 58 is initially actuated at a supply-air pressure less than that required to actuate spring brake valve module 54. For example, module 58 may be unseated at a pressure differential of 65 psi, and module 54 may be actuated at about 75 psig. Accordingly, supply air is charged to reservoir 16 and is available for service brake application prior to release of the spring brakes. This is a safety feature because the spring,brakes are not released until sufficient pressure is available to actuate the service brakes. Otherwise, circumstances could develop whereby a trailer would have no effective braking.

As already indicated, any risk associated with releasing the spring brakes prior to having service brake capability is mitigated in part by the fact that modern tractor-trailer combinations have other safety features, including both light and sound signals in the tractor for alerting the driver of problems in the trailer brake system. Automatic devices are also employed for cutting off the supply air from the tractor to the trailer upon loss of pressure below a predetermined level in the trailer system. This assures that the tractor air supply is preserved for braking purposes in the event that the trailer system loses pressure.

It will be noted in FIG. 4 that even though the spring brake valve module 54 has not yet shifted, whereby the spring brake chambers are still connected to exhaust and the spring brakes are fully applied, control air from line 40 has shifted the relay valve module 56 whereby pressurized air from supply-air port 44 and reservoir port 48 passes through full-function valve 10 and is directed via port 52 and line 36 to the service brake chambers. Accordingly, service brake capability in the trailer is available prior to release of the spring brakes.

Figure 5:
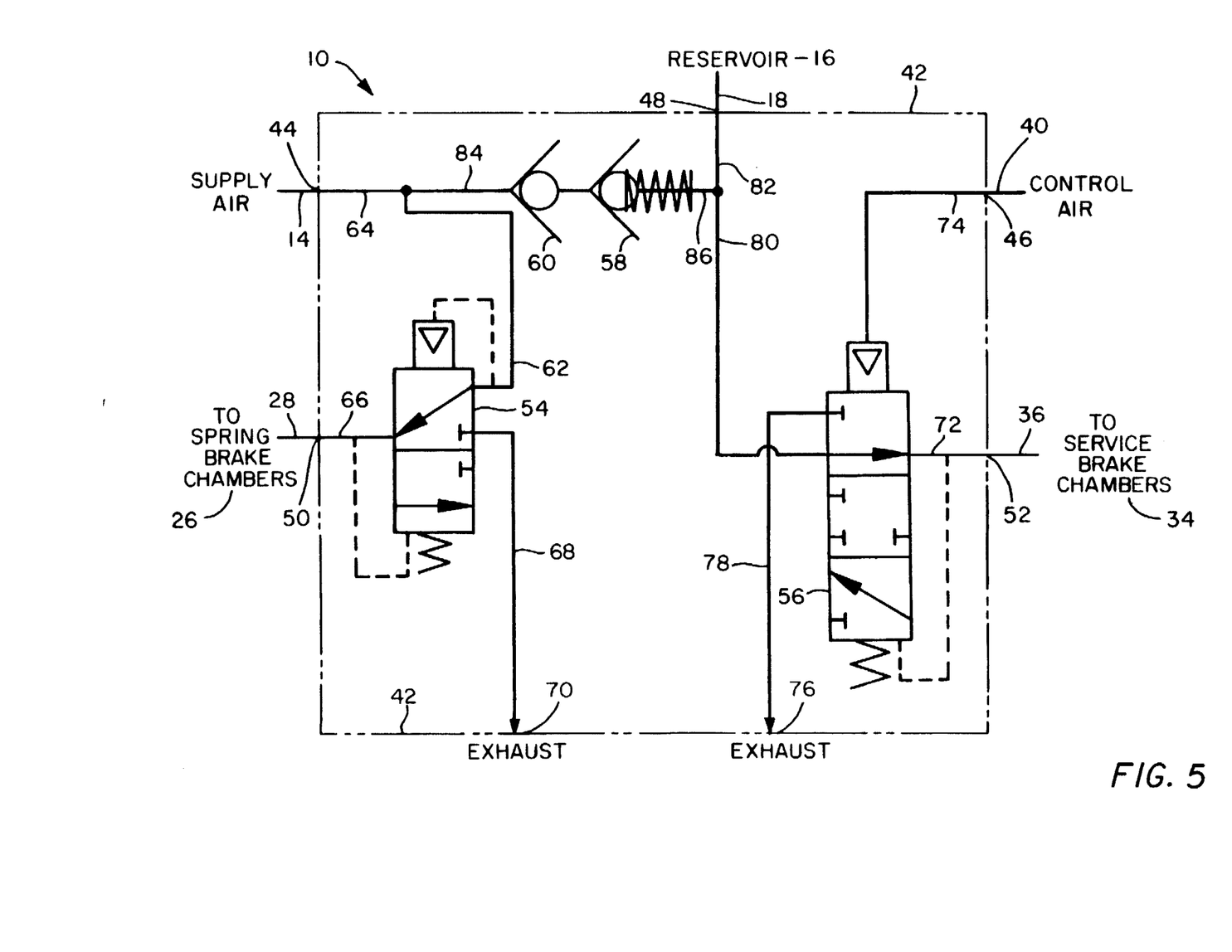
FIG. 5 is generic to the embodiments of FIGS. 2–4 in that it depicts the dispositions of the spring brake and biased one-way pressure protection valves at a supply-air pressure at or higher than that required to activate both valves, and also depicts the disposition of the service brake valve module upon the application of increasing control-air pressure.

The schematic of FIG. 5 is generic to FIGS. 2–4 and depicts a normal trailer braking situation. Spring brake valve module 54 under the influence of supply air at a sufficient pressure has shifted to the spring brake release position and supply air and reservoir air is available for service brake actuation. As depicted, control air has shifted relay valve module 56 to the service brake actuation position whereby supply air from line 14 and reservoir 16 is applying the service brakes; and braking of the trailer is being controlled by the driver in a known manner.

Other operations of full-function valve 10 will be apparent to those skilled in the art in the light of the above disclosure and the prior art. Thus, for example, one-way check valve 60 prevents pressurized air in the reservoir from escaping through port 44 and line 14 or from actuating the spring brake module and spring brakes. As another example, the intermediate or lap position of the relay module 56 schematically represents the aforementioned third mode thereof.

The advantage of a full-function valve, the design of which lends itself to satisfying alternative requirements simply by changing the relationship of the actuation pressures of certain components, is manifest, particularly in view of the fewer components required. The flexibility of a design which can be adapted to either releasing the spring brakes prior to or only when supply air is already available to the service brakes is imparted in part by virtue of the fact that the port and related internal passageways for the spring brake chambers are fluid-communicatively-isolated from reservoir 16, service brake chambers 34 and the control air, at least from the standpoint of flow to the spring brake module. This flexibility is present despite the fewer internal elements within the envelope 42 of full-function valve 10.

As is apparent from the above description, the full-function valve of the present invention copes with the operating and safety requirements of modern semi-trailers and meets regulatory requirements. It does so using fewer components than other comparable approaches. In addition, it has an element of flexibility not present in other more-complex, full-function valve designed for the same purpose. This is reflected, for example, in the present design by virtue of being able to have the spring brakes released prior to the charging of the service brake reservoir, or the reverse, simply by adjustment of the activation pressure relationship between the spring brake valve module and the pressure protection valve module. It otherwise achieves the various objects of the present invention as previously set forth.

It is to be understood any allowed claims based on this application are to be accorded a range of equivalence commensurate in scope with the advance made over the prior art.

Having described the invention what is claimed is:

1. A simplified integrated full-function valve for heavy duty brake systems comprising a full-function valve body having individual ports for fluid communication with spring brake chambers, service brake chambers, pressurized-air reservoir and exhaust and for receiving pressurized control and supply air from respective sources thereof;

internal passageways within said valve body in fluid communication with said ports and disposed so as to communicate pressurized control air for service brake control, and supply air to and from the reservoir, the spring brake chambers and the service brake chambers of the air brake system, and to exhaust;

a plurality of valve modules within said full-function valve body and disposed to selectively determine the fluid communications within said internal passageways and ports responsive to the respective positions of the valve modules;

the port and related internal passageways for said spring brake chambers being fluid-communicatively-isolated from said reservoir, said service brake chambers and said control air, whereby the number of said internal passageways within said valve body is minimized;

said plurality of valve modules comprising:

(a) a spring brake valve module within said full-function valve body providing (i) fluid communication from the spring brake port of said valve body to the exhaust port when air pressure at the supply port is less than a first predetermined pressure, and (ii) fluid communication from the supply port of said valve body to the spring brake ports when the air pressure at the supply port is at or higher than said first predetermined pressure;

(b) a relay valve module within said full-function valve body for selectively employing supply air to actuate the service brakes responsive to control-air signals received at the control port of said valve body; and (c) a biased one-way pressure protection valve module within said full-function body providing fluid communication from the supply port to the reservoir port and to the relay valve module at or above a second predetermined air pressure at the supply port.

2. The simplified integrated full-function valve of claim 1 wherein said relay valve module (i) in a first mode provides fluid communication between the service brake ports of said full-function valve body and an exhaust port in response to decreasing pressure or zero pressure at said control port; (ii) in a second mode provides at least fluid communication from said reservoir port to said service brake ports in response to increasing pressure at said control port; and (iii) in a third mode blocks fluid communication to and from said service brake port in response to a stabilized elevated pressure at said control port.

3. The simplified integrated full-function valve of claim 1 wherein said biased one-way pressure protection valve has a consistently-disposed unbiased one-way check valve associated therewith.

4. The simplified integrated full-function valve of claim 1 wherein said second predetermined air pressure is higher than said first predetermined air pressure.

5. The simplified integrated full-function valve of claim 1 wherein said second predetermined air pressure is lower than said first predetermined air pressure.

6. The simplified integrated full-function valve of claim 1 wherein said first predetermined air pressure and said second predetermined air pressure can be selected to achieve either: (1) a first mode of operation wherein said second predetermined air pressure is higher than said first predetermined air pressure; or (2) a second mode of operation wherein said second predetermined air pressure is lower than said first predetermined air pressure.

7. The simplified integrated full-function valve of claim 6 wherein said first mode of operation permits fluid communication from the supply port to the spring brake port prior to fluid communication from the supply port to the reservoir port and to the relay valve module and said second mode of operation permits fluid communication from the supply port to the reservoir port and to the relay valve module prior to fluid communication from the supply port to the spring brake port.

8. The simplified integrated full-function valve of claim 7 wherein the mode of operation can be changed to achieve low cost design flexibility.

9. The simplified integrated full-function valve of claim 7 wherein the first mode provides fast drive-away performance and said second mode provides an anti-drive-away feature.

10. A simplified integrated full-function valve for heavy duty brake systems comprising a full-function valve body having individual ports for fluid communication with spring brake chambers, service brake chambers, pressurized-air reservoir and exhaust and for receiving pressurized control and supply air from respective sources thereof;

internal passageways within said valve body in fluid communication with said ports and disposed so as to communicate pressurized control air for service brake control, and supply air to and from the reservoir, the spring brake chambers and the service brake chambers of the air brake system, and to exhaust;

a plurality of valve modules within said full-function valve body and disposed to selectively determine the fluid communications within said internal passageways and ports responsive to the respective positions of the valve modules;

the port and related internal passageways for said spring brake chambers being fluid-communicatively-isolated from said reservoir, said service brake chambers and said control air, whereby the number of said internal passageways within said valve body is minimized;

said plurality of valve modules comprising:
   (a) a spring brake valve module within said full-function valve body providing (i) fluid communication from the spring brake port of said valve body to the exhaust port when air pressure at the supply port is less than a first predetermined pressure, and (ii) fluid communication from the supply port of said valve body to the spring brake ports when the air pressure at the supply port is at or higher than said first predetermined pressure;
   (b) a relay valve module within said full-function valve body for selectively employing supply air to actuate the service brakes responsive to control air signals received at the control port of said valve body, said relay valve module (i) in a first mode providing fluid communication between the service brake ports of said full-function valve body and an exhaust port in response to decreasing pressure or zero pressure at said control port; (ii) in a second mode providing at least fluid communication from said reservoir port to said service brake ports in response to increasing pressure at said control port; and (iii) in a third mode blocking fluid communication to and from said service brake port in response to a stabilized elevated pressure at said control port; and
   (c) a biased one-way pressure protection valve module within said full-function body providing fluid communication from the supply port to the reservoir port and to the relay valve module at or above a second predetermined air pressure at the supply port, said biased one-way pressure protection valve having a consistently-disposed unbiased one-way check valve associated therewith.

11. The simplified integrated full-function valve of claim 10 wherein said second predetermined air pressure is higher than said first predetermined air pressure.

12. The simplified integrated full-function valve of claim 10 wherein said second predetermined air pressure is lower than said first predetermined air pressure.

13. The simplified integrated full-function valve of claim 10 wherein said first predetermined air pressure and said second predetermined air pressure can be selected to achieve either: (1) a first mode of operation wherein said second predetermined air pressure is higher than said first predetermined air pressure; or (2) a second mode of operation wherein said second predetermined air pressure is lower than said first predetermined air pressure.

14. The simplified integrated full-function valve of claim 13 wherein said first mode of operation permits fluid communication from the supply port to the spring brake port prior to fluid communication from the supply port to the reservoir port and to the relay valve module and said second mode of operation permits fluid communication from the supply port to the reservoir port and to the relay valve module prior to fluid communication from the supply port to the spring brake port.

15. The simplified integrated full-function valve of claim 13 wherein the mode of operation can be changed to achieve low cost design flexibility.

16. The simplified integrated full-function valve of claim 13 wherein the first mode provides fast drive-away performance and said second mode provides an anti-drive-away feature.

* * * * *

UNITED STATES PATENT AND TRADEMARK OFFICE
CERTIFICATE OF CORRECTION

PATENT NO.   : 5,553,928
DATED        : September 10, 1996
INVENTOR(S)  : James D. Hart; Michael J. Moody It is certified that error appears in the above-indentified patent and that said Letters Patent is hereby corrected as shown below:

Column 6, line 51, after "spring" delete "," and insert a space.

Signed and Sealed this

Tenth Day of December, 1996

Attest:

BRUCE LEHMAN

*Attesting Officer*   *Commissioner of Patents and Trademarks*